United States Patent
Choi et al.

(10) Patent No.: US 9,647,255 B2
(45) Date of Patent: May 9, 2017

(54) POROUS SEPARATION MEMBRANE, SECONDARY BATTERY USING SAME, AND METHOD FOR MANUFACTURING SAID SECONDARY BATTERY

(71) Applicant: AMOGREENTECH CO., LTD., Gimpo-si (KR)

(72) Inventors: Won Gil Choi, Gunpo-si (KR); Ju Hee Jang, Cheonan-si (KR); Seung Yun Rho, Hwaseong-si (KR); In Yong Seo, Seoul (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 155 days.

(21) Appl. No.: 14/743,043

(22) Filed: Jun. 18, 2015

(65) Prior Publication Data

US 2015/0333310 A1 Nov. 19, 2015

Related U.S. Application Data

(62) Division of application No. PCT/KR2013/011952, filed on Dec. 20, 2013.

(30) Foreign Application Priority Data

| Dec. 21, 2012 | (KR) | 10-2012-0151137 |
| Jul. 12, 2013 | (KR) | 10-2013-0082008 |
| Oct. 31, 2013 | (KR) | 10-2013-0131035 |

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/162* (2013.01);
(Continued)

(58) Field of Classification Search
CPC .... H01M 2/1686; H01M 2/145; H01M 2/162; H01M 2/1673; H01M 10/0404;
(Continued)

(56) References Cited

U.S. PATENT DOCUMENTS

2006/0286446 A1* 12/2006 Chun ............... B32B 27/12
429/142
2010/0304205 A1* 12/2010 Jo ..................... H01G 9/02
429/144

(Continued)

FOREIGN PATENT DOCUMENTS

| KR | 1020020077638 | 10/2002 |
| KR | 1020020077639 | 10/2002 |

(Continued)

OTHER PUBLICATIONS

International Search Report—PCT/KR2013/011952 dated Apr. 25, 2014.

*Primary Examiner* — Gregg Cantelmo

(74) *Attorney, Agent, or Firm* — Cantor Colburn LLP

(57) ABSTRACT

Provides are a porous separator that prevents a short-circuit between two electrodes by using a porous nanofiber web where nanofibers have a core-shell structure, to thereby promote safety and thinning simultaneously. The porous separator includes: a porous nonwoven fabric playing a support role and having micropores; and a porous nanofiber web that is laminated on one side of the porous nonwoven fabric, and plays a role of an adhesive layer and an ion-containing layer when the porous nanofiber web is in close contact with an opposed electrode, wherein a portion of the porous nanofiber web is incorporated in a surface layer of the porous nonwoven fabric, to thus partially block pores of the porous nonwoven fabric and to thereby lower porosity of the porous nonwoven fabric. The porous nanofiber web has (Continued)

nanofibers obtained by spinning a mixture of a swellable polymer and a non-swellable polymer to have a core-shell structure.

15 Claims, 7 Drawing Sheets

(51) Int. Cl.
  *H01M 10/04* (2006.01)
  *H01M 10/0583* (2010.01)
(52) U.S. Cl.
  CPC ...... *H01M 2/1673* (2013.01); *H01M 10/0404* (2013.01); *H01M 10/0583* (2013.01); *H01M 2300/0085* (2013.01); *H01M 2300/0094* (2013.01)
(58) Field of Classification Search
  CPC ....... H01M 10/0583; H01M 2300/085; H01M 2300/094
  See application file for complete search history.

(56) References Cited

U.S. PATENT DOCUMENTS

| | | | | |
|---|---|---|---|---|
| 2011/0177369 A1* | 7/2011 | Endo | ................ | H01M 2/1673 429/94 |
| 2011/0236744 A1* | 9/2011 | Kim | .................... | H01M 2/162 429/144 |

FOREIGN PATENT DOCUMENTS

| | | |
|---|---|---|
| KR | 1020040032910 | 4/2004 |
| KR | 1020070090852 | 9/2007 |
| KR | 1020080013209 | 2/2008 |
| KR | 1020090012726 | 2/2009 |
| KR | 1020100016919 | 2/2010 |
| KR | 1020110049715 | 5/2011 |
| KR | 1020110129109 | 12/2011 |
| KR | 1020120046091 | 5/2012 |
| KR | 1020120046092 | 5/2012 |

* cited by examiner

POROUS SEPARATION MEMBRANE, SECONDARY BATTERY USING SAME, AND METHOD FOR MANUFACTURING SAID SECONDARY BATTERY

CROSS REFERENCE TO RELATED APPLICATIONS

This application is a divisional of International Application No. PCT/KR2013/011952, filed on Dec. 20, 2013, which claims priority to and the benefit of Korean Application Nos. 10-2012-0151137 filed on Dec. 21, 2012; 10-2013-0082008 filed on Jul. 12, 2013; and 10-2013-0131035 filed on Oct. 31, 2013, in the Korean Patent Office, the entire contents of which are incorporated herein by reference.

TECHNICAL FIELD

The present invention relates to a porous separator, a secondary battery using the same and a manufacturing method thereof. More particularly, the present invention relates to a porous separator that prevents short-circuiting between two electrodes by using a porous nanofiber web having a core-shell structure that is obtained by spinning a mixed polymer of a swellable polymer and a non-swellable polymer as nanofibers, to thus promote both stability and thinning, a secondary battery using the porous separator and a manufacturing method thereof.

BACKGROUND ART

Conventionally, an electrolyte that is formed by impregnating a non-aqueous electrolytic solution into a film having pores in which the film is referred to as a separator has been generally used as an electrolyte of a lithium secondary battery. In recent years, a lithium secondary battery (such as a polymer battery) using a polymer electrolyte made of a polymer other than such a liquid-phase electrolyte has attracted attention.

The polymer battery uses an electrolyte in gel form in which a liquid electrolytic solution has been impregnated in the polymer. Since the electrolytic solution is retained in the polymer, it is difficult for the electrolytic solution to leak out. Therefore, the polymer battery has the advantages that the safety of the battery is enhanced, and also the contour of the battery may be formed freely.

The polymer electrolyte has the low conductivity of the lithium ions when being compared with the electrolyte composed of only the electrolytic solution. Thus, due to the low conductivity of the lithium ions, a method for reducing the thickness of the polymer electrolyte is being used. However, when the polymer electrolyte is reduced to be thin in this way, the mechanical strength of the polymer electrolyte is reduced, and the positive electrode and the negative electrode are short-circuited at the time of manufacture of the battery, to thus cause a problem of easily destroying the polymer electrolyte.

Korean Patent Registration No. 10-0637481 proposed a lithium secondary battery having a positive electrode, a polymer electrolyte, and a negative electrode, wherein the polymer electrolyte is formed by impregnating an organic electrolyte solution in a nonwoven fabric having at least gelling fibers that are easily gelled by the organic electrolytic solution, and non-gelling fibers, wherein the gelling fibers are polyacrylonitrile-vinyl acetate copolymers, in a gelled state including the organic electrolyte solution, wherein a mixture ratio of the gel-like gelling fibers and the non-gelling fibers is 3:97 to 75:25 at a weight ratio, and a content of vinyl acetate is 5 wt % or more to 20 wt % or less.

Since the polymer electrolyte proposed in Korean Patent Registration No. 10-0637481 is formed by impregnating an organic electrolyte solution in a nonwoven fabric having at least gelling fibers and non-gelling fibers, the uniformity of portions of the gelling fibers that are gelled by the organic electrolytic solution may not be guaranteed to thus be unable to guarantee uniform ion conductivity and to thus cause internal short-circuit possibility. In addition, since the polymer electrolyte is in the form of the nonwoven fabric, it is difficult to achieve a uniform thin film although the polymer electrolyte is gelled.

Korean Patent Registration No. 10-1208698 proposed a secondary battery including: two separate different electrodes; a heat-resistant ultrafine fiber-shaped porous separator interposed between the two electrodes and including ultrafine fibers that are obtained by air electrospinning (AES) a mixture solution of a heat-resistant polymer material having a melting point of 180° C. or higher, and a content of 50 wt % to 70 w %, and a swellable polymer material of 30 wt % to 50 w % that is swellable in an electrolytic solution; and the electrolytic solution or an electrolyte.

However, Korean Patent Registration No. 10-1208698 proposed a porous separator including ultrafine fibers that are obtained by spinning a mixture solution of a heat-resistant polymer material and a swellable polymer material, but did not recognize an advantage of fibers having a core-shell structure and a condition of forming the core-shell structure.

In addition, Korean Patent Application Publication No. 10-2012-46092 proposed a heat-resistant separator including a first pore-free polymer film layer, and a porous polymer web layer that is formed of ultrafine nanofibers that are formed on the first pore-free polymer film layer and are formed of a mixture of a heat resistant polymer and inorganic particles or a mixture of a heat-resistant polymer, a swellable polymer and inorganic particles.

Since the heat-resistant separator is a thin film of a two-layer structure having a thickness of 10 to 60 μm, the tensile strength of the heat-resistant separator is low, handling properties are poor during production, and manufacturing costs are high, to thereby cause weak competitiveness. In general, when compared to other fibers, nanofibers have good relative strength, but have weak absolute strength.

In other words, in the case that a separator is made of only nanofibers, a heavy weight of nanofibers of approximately 10 g/m$^2$ is needed in order to make it possible to perform the handling. However, this heavy weight separator is a factor that is directly connected with a production rate, to thereby cause a high production cost.

In addition, since nanofibers have a large amount of static electricity at the time of a manufacturing process, it may cause a very difficult handling problem in itself. The removal of the static electricity is not possible through the composite process such as lamination, but it is possible to improve handling properties.

Furthermore, since a polymer web separator has a porosity of 80% or so and thus movement of ions is performed so well, micro-short may occur to thus cause a phenomenon of OCV (open circuit voltage) degradation.

Since a nonwoven fabric made of a PP/PE (Polyethylene/Polypropylene) or PET (PolyEthylene Terephthalate) fiber has too a high porosity, it is not possible to use the nonwoven fabric alone as a separator. In particular, since the nonwoven fabric has a porosity of 70 to 80%, an OCV characteristic is poor by self-discharge, a large variation in pores occurs, and large-sized pores exist.

When considering the above-described conventional defects, a ceramic layer is added in a nonwoven fabric by mixing inorganic particles with a binder, to thus obtain a separator that reduces the porosity and reinforces the heat resistance. However, such a separator has a problem that the production process is complicated, and the inorganic particles are eliminated.

SUMMARY OF THE INVENTION

The inventors have found that nanofibers that are obtained by spinning a mixture of a swellable polymer that are swelled and gelled in an electrolytic solution with a non-swellable polymer have a core-shell structure when a difference between the molecular weights of the two mixed polymers is equal to or larger than a set value. In this case, the non-swellable polymer having a greater molecular weight is located in a core portion of the nanofibers and the swellable polymer having a less molecular weight is located in a shell portion of the nanofibers. In addition, as being compared with the swellable polymer, the non-swellable polymer has a molecular weight greater than the swellable polymer and thus appears to have a relatively high melting point.

Thus, when a gelling process proceeds at a temperature higher than a melting point of a swellable polymer and lower than a melting point of a non-swellable polymer, in a gelling heat treatment process after injecting an organic electrolytic solution, a swellable polymer shell that is disposed outside of nanofibers is gelled but a non-swellable polymer core that is disposed inside of the nanofibers is only feebly swelled to thereby allow chains of the non-swellable polymer to be maintained without being cut and to thereby maintain a matrix shape. The present invention has been made based on this discovery.

Accordingly, the present invention has been made to solve the problems of the prior art, and it is an object to provide a porous separator, a secondary battery using the porous separator, and a method of manufacturing the secondary battery, in which nanofibers constituting a porous nanofiber web form a core-shell structure, and a swellable polymer shell that is disposed outside of the nanofibers is gelled, but a non-swellable polymer core that is disposed inside of the nanofibers maintains a uniform web-like shape, with respect to the whole polymer electrolyte film, to thus prevent a short circuit between a positive electrode and a negative electrode to promote safety, to thereby form the porous separator.

It is another object of the present invention to provide a porous separator, a secondary battery using the porous separator, and a method of manufacturing the secondary battery, which can ensure quick and uniform impregnation of an organic electrolytic solution by using a porous nanofiber web made of nanofibers having a core-shell structure, a secondary battery using the porous separator, and a method of manufacturing the secondary battery.

It is still another object of the present invention to provide a porous separator, a secondary battery using the porous separator, and a method of manufacturing the secondary battery, in which a swellable polymer that is placed in an outer shell of nanofibers constituting a porous electrolyte matrix is gelled completely, and thus a liquid-phase electrolytic solution is almost non-existent and is converted to a solid-phase electrolyte, to thus prevent leakage and to increase safety and ionic conductivity with thinning.

It is a yet object of the present invention to provide a secondary battery in which a non-swellable porous thin-film sheet is wound on the outside of an electrode assembly, to thus suppress a phenomenon that expansion and contraction of the electrode assembly arise at the time of charging and discharging processes to thereby prevent segregation between an electrolyte and an electrode, and to thus suppress an increase in an interface resistance, and a method of manufacturing the secondary battery.

It is yet still object of the present invention to provide a porous separator in which a thin-film pore-free film or a porous nanofiber web is added on one side of a porous nonwoven fabric used as a support, thereby lowering porosity and thus inhibiting OCV (open circuit voltage) degradation, and a secondary battery using the porous separator.

It is a further object of the present invention to provide a porous separator using a porous nonwoven fabric that is used as a strength support and available at a low cost, thus increasing the tensile strength and improving the handling property during the production, and utilizing a thin-film pore-free film or a porous nanofiber web, to thus significantly reduce the manufacturing cost, and a secondary battery using the porous separator.

To accomplish the above and other objects of the present invention, according to an aspect of the present invention, there is provided a porous separator comprising: a porous nonwoven fabric playing a support role and having micropores; and a porous nanofiber web that is laminated on one side of the porous nonwoven fabric, and plays a role of an adhesive layer and an ion-containing layer when the porous nanofiber web is in close contact with an opposed electrode, wherein a portion of the porous nanofiber web is incorporated in a surface layer of the porous nonwoven fabric, to thus partially block pores of the porous nonwoven fabric and to thereby lower porosity of the porous nonwoven fabric.

According to another aspect of the present invention, there is provided a porous separator comprising: a porous nonwoven fabric playing a support role and having micropores; and a pore-free film that is laminated on one side of the porous nonwoven fabric, and plays a role of an adhesive layer and an ion-containing layer when the porous nanofiber web is in close contact with an opposed electrode, wherein a portion of the porous nanofiber web is incorporated in a surface layer of the porous nonwoven fabric, to thus partially block pores of the porous nonwoven fabric.

Preferably but not necessarily, the porous nanofiber web is made of a polymer that is swelled in an electrolytic solution, and whose electrolytic ions are conductible.

Preferably but not necessarily, the polymer is any one of PVDF, PEO, PMMA, and TPU.

Preferably but not necessarily, the polymer is a CTFE (chlorotrifluoroethylene)-based PVDF copolymer or a HFP (hexafluoropropylene)-based PVDF copolymer.

Preferably but not necessarily, the CTFE-based PVDF copolymer contains CTFE of 15 to 20 wt % in VF (vinylidene fluoride), and the HFP-based PVDF copolymer contains HFP of 4 to 12 wt % in the VF.

Preferably but not necessarily, thickness of the porous nanofiber web is set to be in a range from 1 to 10 μm, and thickness of the porous nonwoven fabric is set to be in a range from 10 to 40 μm.

Preferably but not necessarily, the porous nonwoven fabric is any one of a nonwoven fabric made of PP/PE fibers of a double structure where PE is coated on an outer periphery of a PP fiber as a core, a PET nonwoven fabric made of polyethylene terephthalate (PET) fibers, and a nonwoven fabric made of cellulose fibers.

Preferably but not necessarily, the porous nanofiber web comprises a plurality of nanofibers having a core-shell structure, along the longitudinal direction thereof, wherein each of the plurality of nanofibers comprises a swellable polymer shell disposed at the outside thereof and made of a swellable polymer that is swelled in an organic electrolytic solution, and a non-swellable polymer core at the inside thereof and made of a non-swellable polymer.

Preferably but not necessarily, a molecular weight difference between the swellable polymer and the non-swellable polymer is at least 20 times.

Preferably but not necessarily, the porous nanofiber web comprises the non-swellable polymer of 40 to 90 wt % and the swellable polymer of 10 to 60 wt %.

According to another aspect of the present invention, there is provided a secondary battery comprising: a positive electrode; a negative electrode; a separator separating the positive electrode and the negative electrode; and an electrolytic solution, wherein the separator comprises: a porous nonwoven fabric playing a support role and having micropores; and a porous nanofiber web that is laminated on one side of the porous nonwoven fabric, and plays a role of an adhesive layer and an ion-containing layer when the porous nanofiber web is in close contact with an opposed electrode, wherein a portion of the porous nanofiber web is incorporated in a surface layer of the porous nonwoven fabric, to thus partially block pores of the porous nonwoven fabric and to thereby lower porosity of the porous nonwoven fabric.

Preferably but not necessarily, the porous nanofiber web is made of a polymer that is swelled in an electrolytic solution, and whose electrolytic ions are conductible, and the polymer is a CTFE (chlorotrifluoroethylene)-based PVDF copolymer or a HFP (hexafluoropropylene)-based PVDF copolymer.

Preferably but not necessarily, the porous nanofiber web comprises a plurality of nanofibers having a core-shell structure, along the longitudinal direction thereof, wherein each of the plurality of nanofibers comprises a swellable polymer shell disposed at the outside thereof and made of a swellable polymer that is swelled in an organic electrolytic solution, and a non-swellable polymer core at the inside thereof and made of a non-swellable polymer.

Preferably but not necessarily, the porous nanofiber web is impregnated in the electrolytic solution where a lithium salt is dissolved in a non-aqueous organic solvent, to then undergo a gelling process, in a manner that the swellable polymer shell disposed at the outside of each of the nanofibers is gelled by the electrolytic solution, and the non-swellable polymer core at the inside thereof maintains a web-like shape.

Preferably but not necessarily, the porous nanofiber web undergoes a gelling process, to thus constitute a polymer electrolyte.

Preferably but not necessarily, the positive electrode and the negative electrode are made of a plurality of unit electrode cells that are stacked alternately, and are separated by the polymer electrolyte, further comprising: a compression band to block a plurality of the positive electrode unit cells and a plurality of the negative electrode unit cells that are separated by the polymer electrolyte and stacked from expanding in a lamination direction of the electrodes.

According to another aspect of the present invention, there is provided a secondary battery comprising: an electrode assembly where a plurality of unit positive electrode cells and a plurality of unit negative electrode cells are separated and alternately stacked by using a pair of porous nanofiber webs having a plurality of nanofibers each made of a non-swellable polymer and a swellable polymer; a compression band for taping the outer periphery of the electrode assembly; and a case containing a built-in electrode assembly that is taped with a compression band, and including an injected electrolytic solution, wherein when a gelling process proceeds, a swellable polymer shell disposed at the outside of each of the nanofibers is gelled by the electrolytic solution, and a non-swellable polymer core disposed at the inside thereof maintains a web-like shape.

According to another aspect of the present invention, there is provided a method of manufacturing a secondary battery comprising the steps of: dissolving a swellable polymer and a non-swellable polymer in a solvent to form a mixed polymer spinning solution; forming a porous nanofiber web made of a plurality of nanofibers that are formed by spinning the mixed polymer spinning solution in which the swellable polymer and the non-swellable polymer have a core-shell structure; inserting the porous nanofiber web between a positive electrode and a negative electrode each having a plurality of unit electrode cells, to thus form an electrode assembly; putting the electrode assembly in a case to then inject an electrolytic solution; and undergoing a gelling heat treatment process, thus swelling a swellable polymer shell disposed outside of each of the nanofibers by the electrolytic solution, and maintaining the non-swellable polymer core at the inside thereof to have a web-like shape.

Preferably but not necessarily, the porous nanofiber web is formed by spinning the mixed polymer spinning solution on a strip-type transfer sheet, the step of forming the electrode assembly further comprises the steps of: encapsulating both sides of each of the plurality of unit electrode cells with a pair of porous nanofiber webs, while continuously transferring the plurality of unit electrode cells; and separating the transfer sheet from the pair of porous nanofiber webs after the encapsulating step.

As described above, according to the present invention, a nanofiber web that is formed of nanofibers that are obtained by spinning a mixture of a swellable polymer that is swelled in an electrolytic solution and is gelled and a non-swellable polymer is used as a porous separator, to thereby guarantee uniform impregnation of the electrolytic solution when the organic electrolytic solution is impregnated.

In the present invention, nanofibers constituting a porous nanofiber web form a core-shell structure, and a swellable polymer shell that is disposed outside of the nanofibers is gelled, but a non-swellable polymer core that is disposed inside of the nanofibers maintains a uniform web-like shape, with respect to the whole polymer electrolyte film, to thus prevent occurrence of a short circuit between a positive electrode and a negative electrode to promote safety, and to simultaneously prevent occurrence of a short circuit due to separation of crystals caused by lithium dendrite.

Moreover, since the non-swellable polymer core that maintains the web-like shape in the porous separator remains between the positive electrode and the negative electrode, thickness of the polymer electrolyte itself may be thinned as much as the swellable polymer shells that are filled in the positive and negative electrodes, and the ionic conductivity between the positive and negative electrodes may be increased due to homogeneous impregnation.

In the invention, a thin-film adhesive layer is provided at the outer side of the polymer electrolyte, thereby improving adhesion to the positive electrode or the negative electrode, and simultaneously preventing occurrence of the short circuit caused by lithium dendrite growth.

In addition, the outer portion of the electrode assembly in the present invention is taped with a thin-film band, and thus expansion and contraction of the electrode assembly at the time of charging and discharging processes are guided to occur in the lateral direction of the electrode assembly instead of in the vertical direction of the electrode assembly, to thereby prevent segregation between an electrolyte and an electrode, and to thus suppress an increase in an interface resistance, thus minimizing OCV (open circuit voltage) degradation.

Furthermore, in the present invention, since a portion of the swellable polymer is filled in the positive and negative electrodes, at a state where the portion of the swellable polymer is continuous to the polymer electrolyte, the portion of the swellable polymer is bonded to the positive and negative electrodes and the polymer electrolyte, thus minimizing OCV (open circuit voltage) degradation.

Further, in the present invention, a void ratio (that is, a porosity) is lowered by using a porous separator that is formed by adding an ultrathin-film pore-free film or a porous nanofiber web on one side of a porous nonwoven fabric used as a support, to thereby suppress degradation of the open circuit voltage (OCV).

In the present invention, a porous separator uses a porous nonwoven fabric that is used as a strength support and available at a low cost, thus increasing the tensile strength and improving the handling property during the production, and utilizes an ultrathin-film pore-free film or a porous nanofiber web, to thus significantly reduce the manufacturing cost.

Further, in the present invention, a polymer that is swelled in an electrolytic solution and whose electrolytic ions are conductible is electrospun directly on a porous nonwoven fabric, and thus a portion of an ultrathin-film pore-free film or a porous nanofiber web is embedded in a side surface of the nonwoven fabric, to thereby provide a composite thin-film porous separator having excellent impregnating ability of the electrolytic solution and excellent adhesion.

Further, the porous separator according to the present invention enhances the adhesion to the electrode by laminating and forming an ultrathin-film pore-free film or a porous nanofiber web on one side of a porous nonwoven fabric used as a support, to thereby prevent leaving or peeling off of the separator from occurring during the assembly process, improve safety of a secondary battery, and prevent performance degradation of the secondary battery.

The porous separator according to the present invention may exhibit a complementary effect of the strength when an ultrathin-film pore-free film or a porous nanofiber web is laminated on a nonwoven fabric or the like, and may also implement a valuable product as a low weight of nanofibers through the lamination, to thereby contribute to the mass-production and low cost of the nanofibers.

DETAILED DESCRIPTION OF THE INVENTION

The foregoing objects, features and advantages will become further obvious through the following detailed description which will be described in detail with reference to the attached drawings, whereby one who has an ordinary skill in the art will readily carry out the invention.

In addition, a detailed description of the present invention will be omitted if it is determined that a specific description of the known art to which the present invention belongs may unnecessarily obscure the subject matter of the present invention.

Hereinafter, a polymer electrolyte according to an exemplary embodiment of the present specification means a pore-free gel-type polymer electrolyte that is configured by: assembling a porous separator or a porous nanofiber web in an inside of a case together with a positive electrode and a negative electrode; injecting an organic electrolytic solution in the case; and carrying out a gelling process in a state where the organic electrolytic solution is impregnated in the porous separator, in which a liquid-phase organic solvent does not substantially remain. When a porous separator used to form a polymer electrolyte is made of a mono-layer nanofiber web, the nanofiber web may be used to mean the porous separator.

Figure 1:
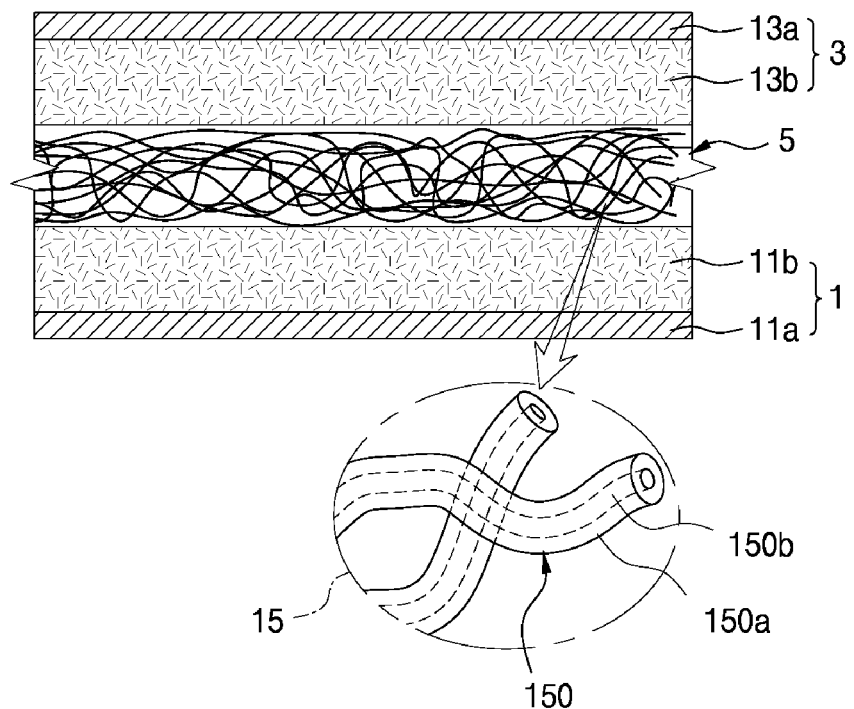
FIG. 1 is a cross-sectional view of a lithium secondary battery according to an embodiment of the present invention.
Figure 2:
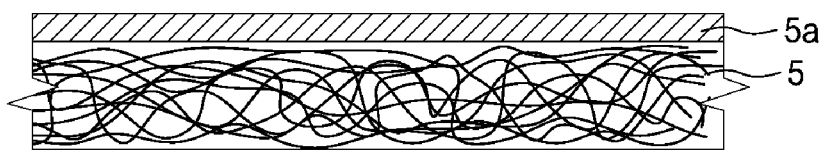
FIG. 2 is a cross-sectional view of a composite porous separator according to an embodiment of the present invention.

FIG. 1 is a cross-sectional view of a lithium secondary battery according to an embodiment of the present invention, and FIG. 2 is a cross-sectional view of a composite porous separator according to an embodiment of the present invention.

Referring to FIG. 1, the lithium secondary battery according to the embodiment of the present invention, that is, a lithium polymer battery, is configured to include a positive electrode 1, a pore-free gel-type polymer electrolyte 5, and a negative electrode 3, when forming a full cell.

The positive electrode 1 is provided with a positive electrode active material layer 11*b* on one surface of a positive electrode current collector 11*a*, and the negative electrode 3 is provided with a negative electrode active material layer 13*b* on one surface of a negative electrode current collector 13*a*.

However, the positive electrode 1 is arranged to face the negative electrode 3 and may be provided with a pair of positive electrode active material layers on both surfaces of the positive electrode current collector 11*a* to form a bi-cell.

The positive electrode active material layer 11b includes a positive electrode active material capable of reversibly intercalating and deintercalating lithium ions, and a typical example of such a positive electrode active material may be a material that can occlude and release lithium, such as $LiCoO_2$, $LiNiO_2$, $LiNiCoO_2$, $LiMn_2O_4$, $LiFeO_2$, $V_2O_5$, $V_6O_{13}$, TiS, MoS, or an organic disulfide compound or an organic polysulfide compound. However, in some embodiments according to the present invention, it is possible to use other types of positive electrode active materials in addition to the positive electrode active material.

The negative electrode active material layer 13b includes a negative electrode active material capable of intercalating and deintercalating lithium ions, and such a negative electrode active material can be selected from the group consisting of a carbon-based negative active material of crystalline or amorphous carbon, a carbon fiber, or a carbon composite material, tin oxide, materials that lithiate these, lithium, lithium alloys, and mixtures thereof. However, the present invention is not limited to the negative electrode active material.

In the same manner as a method that was generally used in a conventional lithium ion battery, the positive electrode 1 and the negative electrode 3 may be obtained by: preparing a slurry by mixing an active material, a conductive agent, a binder and an organic solvent of an appropriate amount; casting the prepared slurry on both surfaces of an aluminum or copper sheet foil or mesh as positive and negative electrode current collectors 11a and 13a; and performing drying and rolling processes.

For example, the positive electrode may be obtained by casting a slurry consisting of $LiCoO_2$, Super-P carbon, and polyvinylidene fluoride (PVdF) on an aluminum foil as an active material, a conductive agent, and a binder, and the negative electrode may be obtained by casting a slurry consisting of MCMB (mesocarbon microbeads), super-P carbon, and PVdF on a copper foil. In the positive and negative electrodes, it is preferable to carry out roll-pressing in order to increase adhesion between particles and with the metal foils, after casting slurries, respectively.

The polymer electrolyte 5 is obtained by impregnating an organic electrolytic solution into a porous nanofiber web 15 made of nanofibers that are formed to have a core-shell structure by spinning a mixture of a swellable polymer that is swelled and gelled in an electrolytic solution with a non-swellable polymer, and undergoing a gelling thermal treatment process.

The porous nanofiber web 15 is formed by dissolving a mixture of a swellable polymer that is swelled and gelled in an electrolytic solution with a non-swellable polymer in a solvent, to thus form a spinning solution, spinning the spinning solution to capture an ultrafine nanofiber web, and calendering the ultrafine nanofiber web at a temperature equal to or lower than a melting point of the polymer.

In this case, a predetermined amount of inorganic particles may be contained in the spinning solution in order to enhance the heat resistance of the porous nanofiber web 15.

In addition, in the case that the mixture includes the swellable polymer, the non-swellable polymer, and the inorganic particles, it is preferable that the swellable polymer and the non-swellable polymer are mixed at a weight ratio in a range of 6:4 to 1:9, preferably 5:5 to 3:7.

In addition, when the mixture ratio of the swellable polymer and the non-swellable polymer is smaller than 4:6 as a weight ratio, the lithium ion conductivity increases but the swelling properties of the swellable polymer becomes too large and the amount of non-swellable polymer that serves as a separator for physically isolating the positive electrode 1 and the negative electrode 3 becomes small, to thereby degrade heat-resistance and strength. That is, when undergoing the gelling process after impregnating an organic electrolytic solution, the swellable polymer the shell 150a disposed outside of the nanofiber 150 is swelled, and thus it is difficult for the non-swellable polymer core 150b disposed inside of the nanofiber 150 to maintain a uniform web-like shape with respect to the whole polymer electrolytic film. As a result, the non-swellable polymer core 150b fails to act as a separator, and thus is difficult to prevent short circuit between the positive electrode and the negative electrode, and to achieve stability.

In addition, when the mixture ratio of the swellable polymer and the non-swellable polymer is greater than 1:9 as a weight ratio, the impregnation of the electrolytic solution is not well achieved, and the swelling amount of the swellable polymer is small even if the swelling of the swellable polymer is achieved. As a result, pores of the web may not be clogged, the lithium ion conductivity may decrease and the poor spinning performance may cause a spinning trouble.

When the swellable polymer and the non-swellable polymer are mixed to thus create a mixture polymer and then a mixture polymer is spun to thus obtain a nanofiber, the nanofiber 150 in the porous nanofiber web 15 has a core-shell structure in the case that a difference between the molecular weights of the two mixed polymers is equal to or larger than a set value. For example, if polyvinylidene fluoride (PVdF) having a molecular weight of 10,000 or less as a swellable polymer and polyacrylonitrile (PAN) having a molecular weight of 250,000 as a non-swellable polymer are mixed and then a mixture is spun, the nanofiber 150 has a shape that the non-swellable polymer having a large molecular weight is located at a core portion of the nanofiber 150 and the swellable polymer having a small molecular weight is located at a shell portion of the nanofiber 150. As a result, the porous nanofiber web 15 according to the present invention includes the nanofibers 150 having a core-shell structure in which the swellable polymer shell 150a surrounds the outside of the non-swellable polymer core 150b.

It can be found that the nanofiber 150 has a core-shell structure from the fact that the porous nanofiber web 15 is made of a hydrophobic material and exhibits the hydrophobic property by the polyvinylidene fluoride (PVdF) disposed on the outer side of the nanofiber 150 when it is cold, but the porous nanofiber web 15 is changed to have the hydrophilic property by the polyacrylonitrile (PAN) that is a non-swellable polymer made of a hydrophilic material when the temperature rises above a melting point of a swellable polymer.

Therefore, in the present invention, when a mixture polymer is constituted by a combination of a swellable polymer and a non-swellable polymer, a difference in molecular weights between the swellable polymer and the non-swellable polymer is preferably 20 or more times, and it is required that a polymer should be made into a nanofiber in a spinning method after being dissolved in a solvent.

When the non-swellable polymer is compared with the swellable polymer, the former has a molecular weight larger than the latter and thus has a melting point that is relatively high. In this case, the non-swellable polymer is preferably a resin having a melting point of 180° C. or higher, and the swellable polymer is preferably a resin having a melting point of 150° C. or lower, more preferably a resin having a melting point in a range of 100~150° C.

Furthermore, when the non-swellable polymer is compared to the swellable polymer, any polymer that is swelled relatively slowly or is not swelled in the solvent contained in the organic electrolytic solution is used as the non-swellable polymer due to the difference in the molecular weight.

In the present invention, the swellable polymer is required to include a polymer having an excellent conductivity to act as a passage which carries lithium ions to be oxidized or reduced at the negative electrode and the positive electrode during charging and discharging of the battery.

A swellable polymer that may be used in the present invention is a resin that is swelled in an electrolytic solution, and may be formed into an ultrafine fiber by an electrospinning method, for example, any one selected from the group consisting of: polyvinylidene fluoride (PVdF), poly (vinylidene fluoride-co-hexafluoropropylene), perfluoropolymer, polyvinyl chloride or polyvinylidene chloride, and co-polymer thereof; polyethylene glycol derivatives containing at least one of polyethylene glycol dialkylether and polyethylene glycol dialkyl ester; polyoxide containing at least one of poly (oxymethylene-oligo-oxyethylene), polyethylene oxide and polypropylene oxide; polyacrylonitrile co-polymer containing at least one of polyvinyl acetate, poly (vinyl pyrrolidone-vinyl acetate), polystyrene, polystyrene acrylonitrile co-polymer, and polyacrylonitrile methyl methacrylate co-polymer; and polymethyl methacrylate, and polymethyl methacrylate co-polymer, and any one combination thereof.

In addition, the non-swellable polymer that may be used in the present invention is a resin that can be dissolved in an organic solvent for electrospinning and whose melting point is 180° C. or higher, in which the resin is swelled more slowly than the swellable polymer or is not swelled, by the organic solvent contained in an organic electrolytic solution, for example, any one selected from the group consisting of: aromatic polyester containing at least one of polyacrylonitrile (PAN), polyamide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes containing at least one of polytetrafluoroethylene, polydiphenoxy phosphazene, and poly {bis[2-2-methoxyethoxy phosphazene]}; polyurethane co-polymer containing at least one of polyurethane and polyether urethane; cellulose acetate, cellulose acetate butylrate, and cellulose acetate propionate.

In the present invention, the porous nanofiber web 15 is required to select the difference in molecular weight when the mixture polymer is constituted by mixing the swellable polymer and the non-swellable polymer as the spinning solution used in the production of the porous nanofiber web 15, to thus form the nanofiber 150 of the core-shell structure that the swellable polymer shell 150a surrounds the outside of the non-swellable polymer core 150b. Thus, it is desirable to combine the swellable polymer and the non-swellable polymer so that a difference in molecular weights between the swellable polymer and the non-swellable polymer is preferably at least 20 times.

Figure 3:
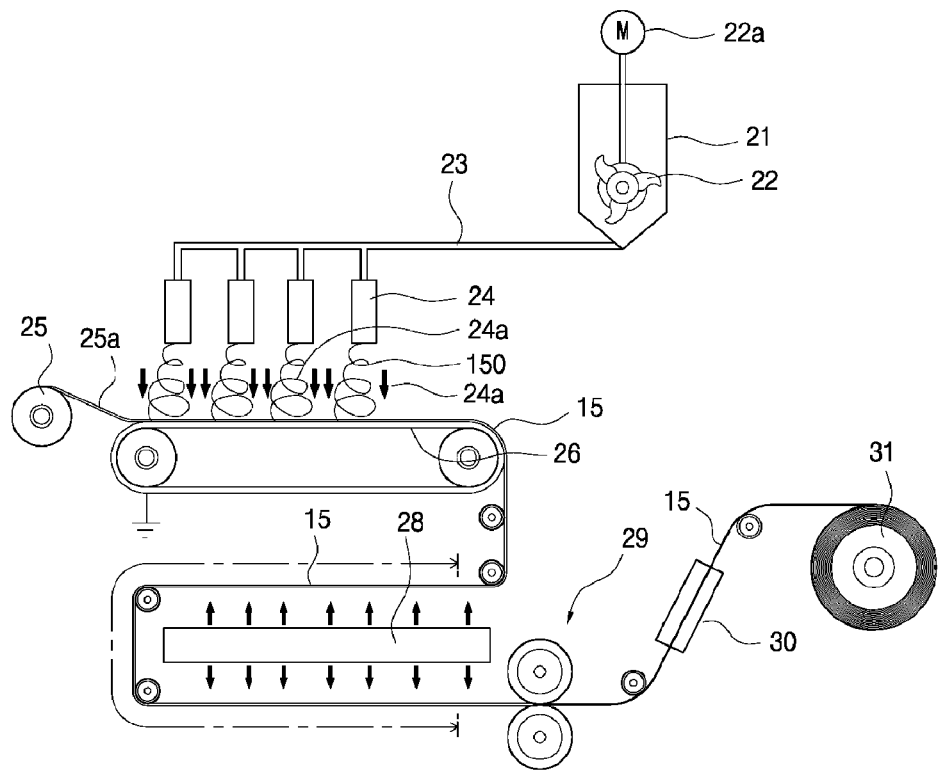
FIG. 3 is a diagram showing a process of manufacturing a porous separator that is used as a polymer electrolyte according to the present invention.

Meanwhile, the porous nanofiber web 15 is obtained by spinning a spinning solution that is obtained by mixing and dissolving a swellable polymer and a non-swellable polymer. As shown in FIG. 3, air-electrospinning (AES) equipment may be preferably used to spin the spinning solution.

A spinning method can be used in the present invention can employ any one selected from general electrospinning, electrospray, electrobrown spinning, centrifugal electrospinning, and flash-electrospinning, in addition to the air-electrospinning (AES).

For example, the porous nanofiber web 15 that is prepared by the air-electrospinning (AES) is preferably formed of 10 to 25 μm thick, more preferably formed of 10 to 15 μm thick. When the thickness of the porous nanofiber web 15 is less than 10 μm, an electric short may happen since the thickness of the non-swellable polymer core 150b remaining after the gelling of the swellable polymer shell 150a has been performed is too thin. Meanwhile, when the thickness of the porous nanofiber web 15 is more than 25 μm, the thickness of the gelled swellable polymer shell 150a is also increased to cause ion conductivity to drop.

The organic electrolytic solution that is incorporated into the porous nanofiber web 15 of the polymer electrolyte 5 includes a non-aqueous organic solvent and a lithium salt solute.

The organic solvent has excellent solubility for the swellable polymer but has low solubility for the non-swellable polymer, and also the nanofiber 150 has a core-shell structure where the swellable polymer shell 150a is located on the outside of the nanofiber. Therefore, the organic solvent of the organic electrolytic solution that is incorporated into the porous nanofiber web 15 mainly enables gelling of the swellable polymer, and acts to plasticize the swellable polymer.

The non-aqueous organic solvent may include carbonate, ester, ether, or ketone. The carbonate may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester may include butyrolactone (BL), decanolide, valerolactone, mevalonolactone, caprolactone, n-methyl acetate, n-ethyl acetate, n-propyl acetate, and the like. The ether may include dibutyl ether, etc. The ketone may include poly methyl vinyl ketone. However, the present invention is not limited to the non-aqueous organic solvent, and may also employ a mixture of at least one thereof.

In addition, the lithium salt acts as a source of lithium ions within a cell and enables a basic operation of a lithium battery. The examples of the lithium salt may be at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiSbF_6$, $LiCl$, $LiI$, $LiAlCl_4$, $LiN(CxF_2x+1SO_2)(CyF_2x+1\ SO_2)$ (here, x and y are natural numbers, respectively) and $LiSO_3CF_3$, or a mixture thereof.

The inorganic particles contained in the porous nanofiber web 15 may include at least one selected from the group consisting of $Al_2O_3$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $SiO_2$, $SiO$, $SnO$, $SnO_2$, $PbO_2$, $ZnO$, $P_2O_5$, $CuO$, $MoO$, $V_2O_5$, $B_2O_3$, $Si_3N_4$, $CeO_2$, $Mn_3O_4$, $Sn_2P_2O_7$, $Sn_2B_2O_5$, and $Sn_2BPO_6$, and a mixture thereof.

In the case that the mixture includes the swellable polymer, the non-swellable polymer, and the inorganic particles, it is preferable that a content of the inorganic particles contained in the porous nanofiber web 15 is in a range of 10 to 25 wt % for the whole mixture, when a size of the inorganic particles is between 10~100 nm. More preferably, a content of the inorganic particles is in a range of 10~20 wt % for the whole mixture, and a size of the inorganic particles is between 15~25 nm.

In the case that a content of the inorganic particles is less than 10 wt % for the whole mixture, a film shape is not maintained, contraction occurs, and a desired heat-resistant property is not obtained. In the case that a content of the inorganic particles exceeds 25 wt % for the whole mixture, a spinning trouble phenomenon that contaminates a spinning nozzle tip occurs, and the solvent quickly evaporates, to thus lower strength of the film.

In addition, in the case that a size of the inorganic particles is less than 10 nm, a volume is too largely bulky and thus it is cumbersome to handle the mixture. In the case that a size of the inorganic particles exceeds 100 nm, a phenomenon of lumping the inorganic particles occurs and thus a lot of the inorganic particles are exposed out of the fibers, to thereby cause the strength of the fibers to drop.

Meanwhile, as in the second embodiment shown in FIG. 2, the present invention can include a very thin pore-free polymer film 5a that is laminated on one side or both sides of the pore-free gel-type polymer electrolyte 5 of the first embodiment of the present invention and is used as an adhesive layer.

For the structure of the porous nanofiber web according to the second embodiment, for example, a first porous nanofiber web 15 is formed by spinning a first spinning solution in which a mixed polymer is dissolved by air-electrospinning (AES) by using a multi-hole spinning pack in which spinning nozzles are disposed at intervals along a travelling direction of a collector, and then a second porous nanofiber web of a thin film is stacked on top of the first porous nanofiber web 15 by using a second spinning solution in which a single polymer is dissolved, to thereby form the first and second porous nanofiber webs of a two-layer structure.

The polymer used to prepare the second spinning solution is a polymer resin that is swelled in an electrolytic solution, enables conducting of lithium ions, and has excellent adhesiveness, and may be made of any one of, for example, PVdF (polyvinylidene fluoride), PEO (polyethylene oxide), PMMA (polymethyl methacrylate), and TPU (thermoplastic polyurethane). In this case, the polymer such as the PVdF is the most preferable polymer having a swelling property in the electrolytic solution, enabling the excellent ion conductivity, and having an excellent adhesiveness.

Thereafter, when the first and second porous nanofiber webs of the two-layer structure are heat treated so that the second porous nanofiber web opposes and passes through, for example, an infrared lamp heater that is set to a temperature slightly lower than the melting point of the second porous nanofiber web, in a subsequent step, the second porous nanofiber web is converted into a pore-free polymer film 5a to thereby obtain a laminate structure of the first porous nanofiber web 15 and the pore-free polymer film 5a.

The pore-free polymer film 5a is preferably formed into a thin film of 2 to 5 µm thick. When the pore-free polymer film 5a is less than 2 µm thick, it is weak to function as an adhesive layer, and when the pore-free polymer film 5a exceeds 5 µm thick, it is difficult to thin the thickness of the entire polymer electrolyte, and ion conductivity is also low.

Referring to FIGS. 3 to 6, a method for manufacturing a lithium ion polymer secondary battery according to the present invention will be described below.

Figure 4:
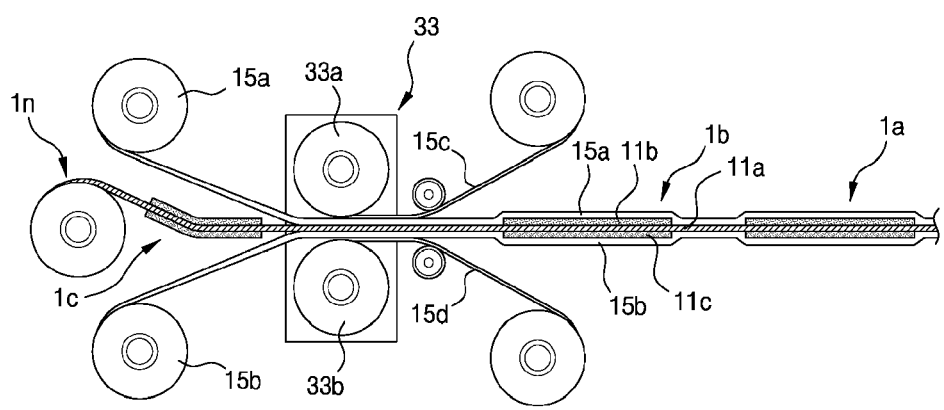
FIG. 4 is a diagram showing a process of sealing a positive electrode and a porous separator that is used as a polymer electrolyte according to the present invention.
Figure 5:
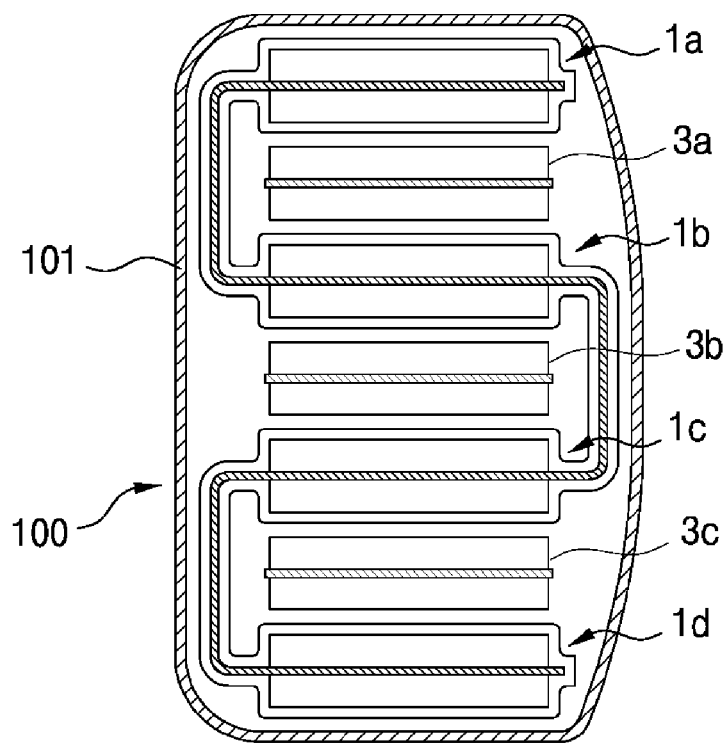
FIG. 5 is a schematic cross-sectional view of an electrode assembly that is assembled according to the present invention.
Figure 6:
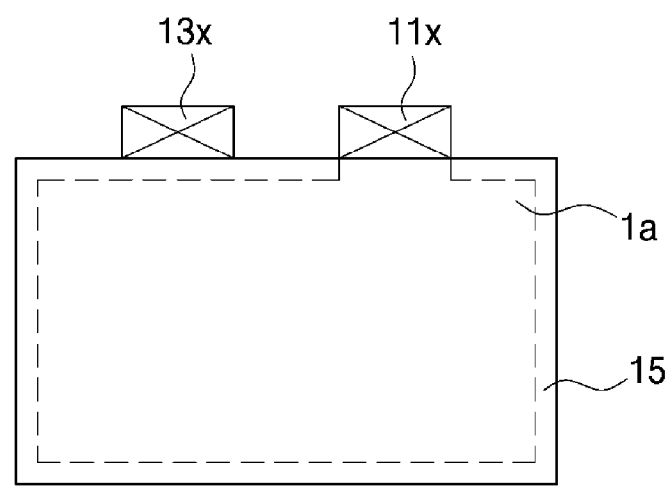
FIG. 6 is a schematic plan view of an electrode assembly that is assembled according to the present invention.
Figure 7:
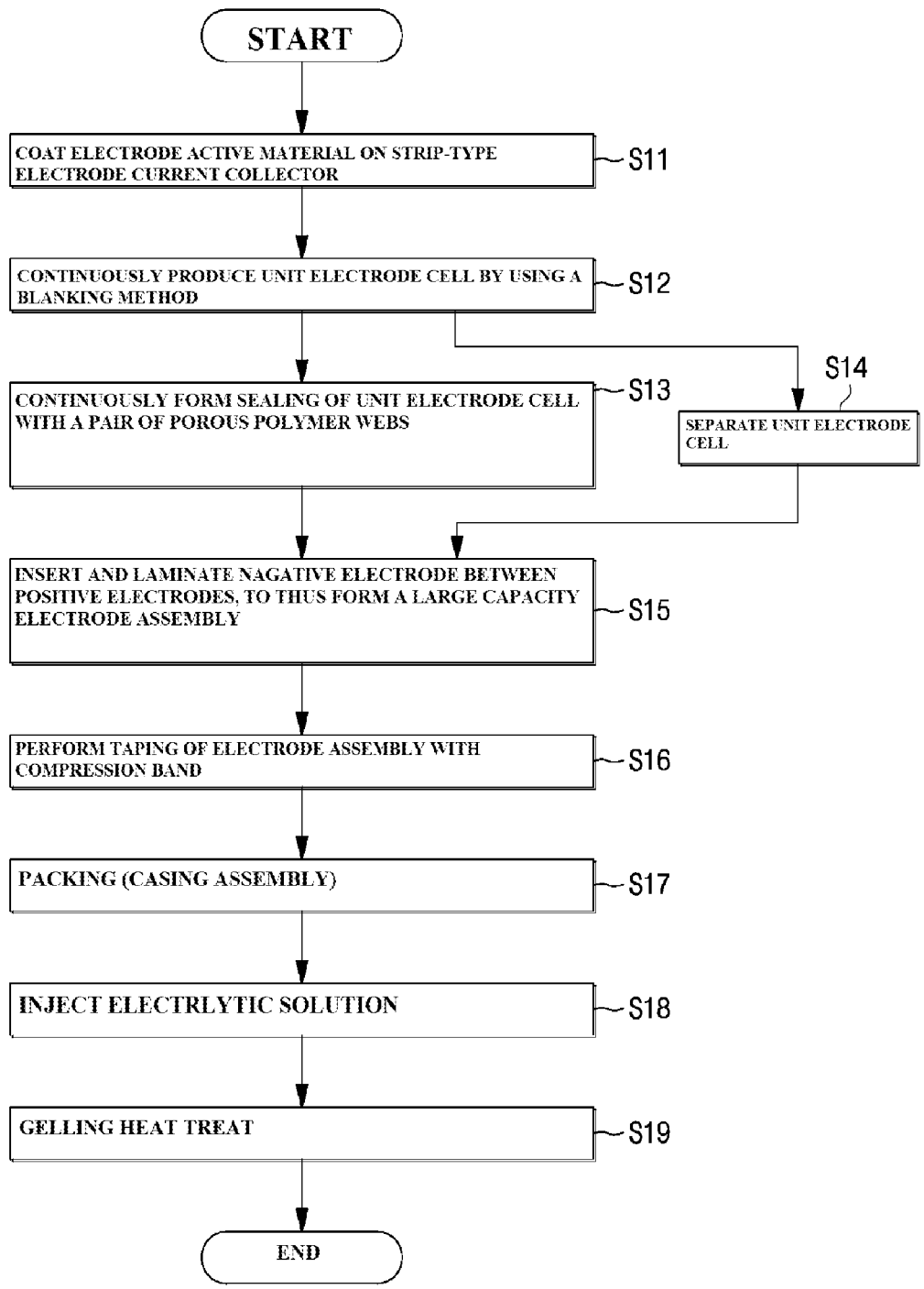
FIG. 7 is a flowchart view showing a process of assembling a lithium secondary battery according to the present invention.

FIG. 3 is a diagram showing a process of manufacturing a porous separator that is used as a polymer electrolyte according to the present invention. FIG. 4 is a diagram showing a process of sealing a positive electrode and a porous separator used as a polymer electrolyte according to the present invention. FIG. 5 is a schematic cross-sectional view of an electrode assembly that is assembled according to the present invention. FIG. 6 is a schematic plan view of an electrode assembly that is assembled according to the present invention.

In the present invention, first, a porous nanofiber web 15 as shown in FIG. 3 is produced by, for example, air-electrospinning (AES).

That is, when a high-voltage electrostatic force of 90 through 120 Kv is applied between each of spin nozzles 24 through which a mixed polymer spinning solution with a sufficient viscosity is spun and a collector 26, by using an air-electrospinning device shown in FIG. 3, an ultrafine fiber 150 is spun to the collector 26, to thus form a porous nanofiber web 15. In this case, since air 24a is sprayed for each spin nozzle 24, the spun nanofiber 150 is prevented from blowing without being captured by the collector 26.

The mixed polymer spinning solution in the present invention is prepared by adding a non-swellable polymer material of 40 to 90 wt % and a swellable polymer material of 10 to 60 wt % in a two-component solvent or in a one-component solvent. In this case, it is preferable to use a two-component solvent that is formed by mixing a solvent of a high boiling point (BP) and a solvent of a low BP as the solvent used for the mixed polymer spinning solution.

The air-electrospinning device used in the present invention includes: a mixing tank 21 having an agitator 22 that uses a mixing motor 22a using a pneumatic pressure as a driving source; and a multi-hole nozzle pack (not shown) in which a number of spin nozzles 24 that are connected with a high-voltage generator are arranged in a matrix form, in order to prevent a phase separation, until a heat-resistant polymer material and a swelling polymer material are mixed with a solvent to then be spun in the case of using a mixed polymer. A mixed polymer spinning solution that is discharged through a number of the spin nozzles 24 that are connected with the mixing tank 21 via a fixed quantity pump (not shown) and a transfer tube 23 passes through the spin nozzles 24 that are electrically charged by the high-voltage generator to then be discharged as the nanofibers 150. Thus, the nanofibers 150 are accumulated on the collector 26 that is grounded and is configured in a conveyor belt form that moves at a constant speed, to thereby form a porous nanofiber web 15.

In this case, in the present invention, a transfer sheet 25a of high tensile strength is continuously sent to an upper portion of the collector 26 of the air-electrospinning device from a transfer roll 25 in order to improve workability of a subsequent process and a positive electrode sealing process to be described later, to thereby laminate the porous nanofiber web 15 on top of the transfer sheet 25a.

The transfer sheet 25a is made of, for example, paper, a nonwoven fabric made of a polymer material that is not dissolved by a solvent contained in a mixed polymer spinning solution during spinning of the mixed polymer spinning solution, or a polyolefin-based film such as PE or PP. In the case that only the porous nanofiber web 15 is formed with no lamination on top of the transfer sheet 25a, a tensile strength of only the porous nanofiber web 15 is low, and accordingly it is difficult to execute a drying process, a calendering process and a winding process while being fed with a high feed rate.

Furthermore, after having produced the porous nanofiber web 15, it is difficult to execute a subsequent sealing process of a positive or negative electrode continuously with a high feed rate. However, in the case of using the transfer sheet 25a, a sufficient tensile strength is provided to thus significantly increase a processing speed.

In addition, when using only the porous nanofiber web 15, a sticking phenomenon to another object due to a static electricity may happen, and thus the workability falls, but the problem can be solved when using the transfer sheet 25a.

After the transfer sheet 25a is subjected to roll pressing of the electrode as shown in FIG. 4, it is peeled off and removed.

When spinning is performed by the air-electrospinning (AES) method using the multi-hole nozzle pack, after the spinning solution has been prepared as described above, spinning of the ultrafine nanofibers 150 of 0.3 to 1.5 µm in diameter is performed, and the nanofibers are fused in a three-dimensional network structure simultaneously with creation of the nanofibers, to thereby form a porous nanofiber web 15 of a layered structure on top of the transfer sheet 25a. The porous nanofiber web 15 made of the ultrafine nanofibers is ultra-thin and ultra-light and has a high ratio of a surface area compared to a volume and a high porosity.

Then, the thus-obtained porous nanofiber web 15 undergoes a process of adjusting an amount of the solvent and moisture remaining on the surface of the porous nanofiber web 15, while passing through a pre-air dry zone by a pre-heater 28. Then, a calendering process is done using a heating compression roller 29.

In the pre-air dry zone by the pre-heater 28, air of 20 to 40° C., is applied to the porous nanofiber web 15 by using a fan, thereby adjusting an amount of the solvent and moisture remaining on the surface of the porous nanofiber web 15. As a result, the porous nanofiber web 15 is controlled so as to be prevented from being bulky. The air blow of the fan plays a role of increasing strength of the separator and controlling porosity of the separator.

In this case, if calendering is accomplished at a state where evaporation of the solvent has been excessively performed, porosity is increased but strength of the web is weakened, Reversely; if less evaporation of the solvent occurs, the web is melted.

The porous nanofiber web calendering process following the pre-air dry process is performed using the heating compression roller 29. In this case, if the calendering, temperature is too low, the web becomes too bulky to have stiffness, and if the calendering, temperature is too high, the web is melted to thus clog the pores. In addition, the thermal compression should be performed at a temperature that the solvent remaining in the web can be completely evaporated. If too little evaporation of the solvent occurs, the web is melted.

In the present invention, the heating compression roller 29 is set to be at a temperature of 170 to 210° C. and a pressure of 0 to 40 kgf/cm$^2$ except for dead weight pressure of the compression roller, to then perform calendering of the porous nanofiber web 15 and execute a primary pre-shrinkage, and to thereby maintain stabilization of the porous nanofiber web 15 at the time of an actual use.

In the case that the heat-resistant polymer material and the swelling polymer material are a combination of for example, polyacrylonitrile (PAN) and polyvinylidene fluoride (PVdF), respectively, the calendering temperature and pressure are as follows:

Combination of PAN and PVdF: 170 to 210° C. and 20 to 30 kgf/cm$^2$

Once the porous nanofiber web calendering process is executed, the porous nanofiber web of 10 to 25 µm thick is obtained.

In addition, the porous nanofiber web 15 obtained by the calendering process carried out as necessary in the present invention, undergoes a process of removing the remaining solvent or moisture by using a secondary hot-air dryer 30 at a temperature 100° C. and with a wind speed of 20 m/sec, to then be wound on a winder 31 as a winding roll of the porous nanofiber web 15 at a state where the transfer sheet 25a is disposed in the inside of the porous nanofiber web 15.

When the swellable polymer and the non-swellable polymer are mixed to thus create a mixture polymer and then a mixture polymer is spun to thus obtain a nanofiber, the nanofiber 150 in the obtained porous separator, that is, the nanofiber web 15, has a core-shell structure in the case that a difference between the molecular weights of the two mixed polymers such as a combination of polyvinylidene fluoride (PVdF) and polyacrylonitrile (PAN).

That is, the nanofiber 150 has a shape that polyacrylonitrile (PAN) having a large molecular weight is located in the core portion of the nanofiber 150 and polyvinylidene fluoride (PVdF) having a small molecular weight is located in the shell portion of the nanofiber 150. As a result, the porous nanofiber web 15 constituting the porous separator according to the present invention is formed of nanofibers 150 having a core-shell structure that the swellable polymer shell 150a surrounds the outer side of the non-swellable polymer core 150b.

Hereinbelow, a process of sealing an electrode and a process of assembling a battery will be described with reference to FIGS. 4 to 7.

Referring to FIG. 4, any one of the positive electrode 1 and the negative electrode 3 can be sealed by a sealing process by using two sheets of porous nanofiber webs 15 as porous separators. In this embodiment, sealing of the positive electrode 1 will be described as an example.

First, the positive electrode 1 is formed by: casting slurries containing positive electrode active materials 11b and 11c on both sides of a strip-shaped positive electrode current collector 11a to form a bi-cell (or a full cell); roll pressing the slurry-cast strip-shaped positive electrode current collector 11a to thus form a positive electrode strip 1n in which a plurality of unit positive electrode cells 1a-1d are sequentially formed; and winding the positive electrode strip 1n on a reel by using a winding machine (S11).

In addition, the negative electrode 3 is formed by: forming a bi-cell (or a full cell) structure in the same way as the positive electrode (S11), thereafter separating an individual unit negative electrode cell from the bi-cell (or a full cell) structure (S14), and preparing a plurality of unit negative electrode cells 3a-3c as shown in FIG. 5.

The positive electrode strip 1n undergoes a blanking process by using blanking equipment before being wound on a reel or before a sealing process shown in FIG. 4 starts, to thereby partially separate a plurality of unit positive electrode cells 1a-1d from the positive electrode strip 1n, while leaving a portion to form a positive electrode terminal 11x (S12).

Further, in the blanking process, the positive electrode strip 1n is transferred by a unit process length according to a step-by-step mode transfer method, then a blanking process is executed for respective unit processes to thus form a plurality of blanks between adjacent unit positive electrode cells 1a-1d, and spaces are formed between the unit positive electrode cells 1a-1d and masking tape applying regions formed on both sides of the unit positive electrode cells 1a-1d, to thereby blank the respective unit positive electrode cells 1a-1d to have a rectangular shape having a certain area such as a rectangular or square area, and to interconnect mutually.

Then, as shown in FIG. 4, in a state where a pair of porous nanofiber webs 15a and 15b that are respectively laminated on transfer sheets 15c and 15d are arranged on the upper and lower portions of the positive electrode strip 1n, the pair of porous nanofiber webs 15a and 15b and the positive electrode strip 1n are made to continuously pass through a roll pressing device 33 formed of a pair of hot press rolls 33a and 33b, to thereby execute a roll pressing process that is performed by applying a heat and pressure (S13).

In this case, a pair of porous nanofiber webs 15a and 15b has a strip shape having a width wider by a predetermined length than the width of the positive electrode strip 1n, as shown in FIG. 6. The pair of porous nanofiber webs 15a and 15b are preferably set to be equal to widths of the unit negative electrode cells 3a-3c. A reference alphanumeric designation '11x' denotes a positive electrode terminal and a reference alphanumeric designation '13x' denotes a negative electrode terminal, in FIG. 6.

In addition, after undergoing the roll pressing process for the sealing of the unit positive electrode cells 1a-1d, the transfer sheets 15c and 15d are peeled off and removed from the porous nanofiber webs 15a and 15b as shown in FIG. 4.

As a result, the pair of porous nanofiber webs 15a and 15b can be sealed by sequentially sealing a plurality of unit positive electrode cells 1a-1d of the positive electrode strip 1n by using a roll-to-roll method, to thus have a high productivity.

Then, for example, as shown in FIG. 5, the unit negative electrode cells 3a-3c are respectively laminated between the plurality of unit positive electrode cells 1a-1d, to thus form an electrode assembly 100 (S15), and then the electrode assembly 100 is taped with a compression band 101 made of a material that is not swelled in an organic solvent and having an excellent tensile strength so as to surround the outside of the electrode assembly 100 (S16).

In general, in a lithium ion polymer battery, an electrode assembly 100 in which a plurality of unit positive electrode cells and a plurality of unit negative electrode cells are stacked has a problem that an inner portion of the electrode assembly 100 is expanded during charging and discharging to thus cause expansion and contraction to occur in the stacking direction of the cells. When this operation is repeated, the liquid-phase electrolytic solution that has been impregnated in the electrode assembly is impregnated with an electrolyte, to thereby cause a phenomenon of separating each of the electrodes and the electrolyte from each other. As a result, the interfacial resistance gradually increases, to thereby cause a problem of reducing an open circuit voltage (OCV).

In the present invention, when the outside of the electrode assembly 100 is taped with a thin film compression band 101 made of a non-swellable material as described above, the expansion and contraction of the electrode assembly 100 is induced to be made to a lateral direction instead of the vertical direction of the electrode assembly 100 during charging and discharging process, to thus prevent segregation between the electrolyte and each of the electrodes, to thus suppress an increase in the interfacial resistance, and to thereby minimize a reduction in the open circuit voltage (OCV).

Furthermore, in the present invention, since a portion of the swellable polymer is charged into the positive electrode 1 and the negative electrode 3 at a state where the portion of the swellable polymer is in succession with the polymer electrolyte 5, the portion of the swellable polymer is adhered to the positive electrode 1 and the negative electrode 3 as well as the polymer electrolyte 5, to thereby minimize a reduction in the open circuit voltage (OCV).

The compression band 101 may be made of, for example, a PP/PE or PE/PP/PE nonwoven fabric or an olefin-based film such as a PET film, or a ceramic thin film, which is available from Celgard Co., Ltd.

In the embodiment illustrated in FIG. 5, it has been described with respect to the structure of forming a large capacity of the electrode assembly 100 by respectively laminating a plurality of unit negative electrode cells 3a-3c between a plurality of unit positive electrode cells 1a-1d by using a Z-folding method, but the present invention is not limited thereto. Alternatively, it is possible to form the electrode assembly 100 by using other methods and perform taping with the compression band 101.

In this case, taping of the compression band 101 may be performed at a state where at least one reinforcing plate is assembled on one side or either side of the electrode assembly 100, as necessary.

For example, the plurality of unit negative electrode cells 3a-3c other than the plurality of unit positive electrode cells 1a-1d are subsequently sealed by using the pair of porous nanofiber webs 15a and 15b, and then a plurality of unit positive electrode cells 1a-1d are laminated between a plurality of unit negative electrode cells 3a-3c, to thus form a large capacity of the electrode assembly 100.

In addition, the porous nanofiber webs 15a and 15b are placed between the positive electrode 1 and the negative electrode 3, and then are integrated by a heat lamination process, to then be laminated or wound in a roll type to thereby be assembled in a case.

Further, the porous nanofiber webs 15a and 15b are bonded on one surface of the positive electrode 1 and the negative electrode 3, and then the positive electrode 1 and the negative electrode 3 on one surface of which the porous nanofiber webs 15a and 15b are formed are laminated one on the other, to then be integrated by a heat lamination process, and to then be laminated or wound in a roll type, to thereby be assembled in a case.

Then, the electrode assembly 100 that has been taped with the compression band 101 is built in a case (not shown) (S17), the organic electrolytic solution is injected into the case, and heat-treated and sealed so that a gelling process is achieved (S18 and S19). In this case, it is established so that an appropriate amount of the organic electrolytic solution is injected to allow the awellable polymer included in the porous nanofiber web 15 to be swelled into 300 to 500% in volume and gelled out and to make the liquid-phase organic solvent substantially non-existent.

In the present invention, since the porous nanofiber webs 15a and 15b disposed between the positive electrode 1 and the negative electrode 3 are porous separators having a three-dimensional pore structure, impregnation will be done very quickly when an organic electrolytic solution is injected into the case.

The gelling process is achieved by heating the swellable polymer under the condition of a range of 10 minutes to 600 minutes at a temperature of 40° C. to 120° C. and then cooling the swellable polymer after injecting the organic electrolytic solution.

Thus, when the gelling process proceeds at a temperature higher than a melting point of a swellable polymer and lower than a melting point of a non-swellable polymer, in a gelling heat treatment process after injecting an organic electrolytic solution, a swellable polymer shell 150a that is disposed outside of nanofibers 150 is gelled through plasticization, but a non-swellable polymer core 150b that is disposed inside of the nanofibers 150 is only feebly swelled to thereby allow chains of the non-swellable polymer to be maintained without being cut and to thereby maintain a matrix shape.

As a result, the polymer electrolyte 5 is made to form a pore-free gel-type electrolyte in which a liquid-phase organic solvent does not substantially remain as a whole, by the swellable polymer shell 150a having been gelled. Simultaneously, the non-swellable polymer core 150b is not swelled in the electrolytic solution but maintained as a matrix shape.

As a result, the gel-type the swellable polymer shell 150a exerts a function as a lithium ion conductor, which carries lithium ions to be oxidized or reduced at the negative electrode 3 and the positive electrode 1 at the time of charging and discharging of the battery, and the non-swellable polymer core 150b plays a role of a separator that physically isolates the positive electrode 1 and the negative electrode 3, to thereby prevent a short circuit between the positive electrode 1 and the negative electrode 3, to thus improve the safety.

In this case, part of the swellable polymer that has been swelled is penetrated into the positive electrode 1 and the negative electrode 3 through the gelling process, to thus reduce the interfacial resistance between each of the electrodes and the polymer electrolyte 5 and simultaneously promote thinning of a thin film of the polymer electrolyte 5.

In addition, since the nanofiber 150 having a core-shell structure according to the present invention has a structure that the swellable polymer shell 150a surrounds the outside of the non-swellable polymer core 150b, the swellable polymer shell 150a that is disposed outside of nanofiber 150 is swelled uniformly in the injected organic electrolytic solution when impregnating the organic electrolytic solution and undergoing the gelling process, to thus reveal the cell characteristics with respect to the entirety of the electrolyte membrane uniformly.

In the above-described embodiment, it has been illustrated to use a porous nanofiber web 15 of a single layer made of nanofibers 150 as a separator in order to form a polymer electrolyte 5, but the present invention is not limited thereto but may employ a composite porous separator of a multi-layer structure.

Figure 8:
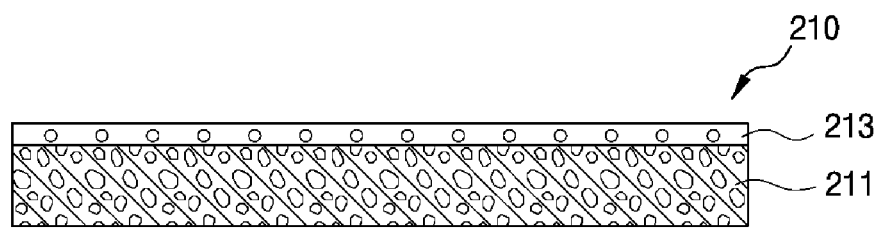
FIG. 8 is a cross-sectional view of a composite porous separator according to an embodiment of the present invention.
Figure 9:
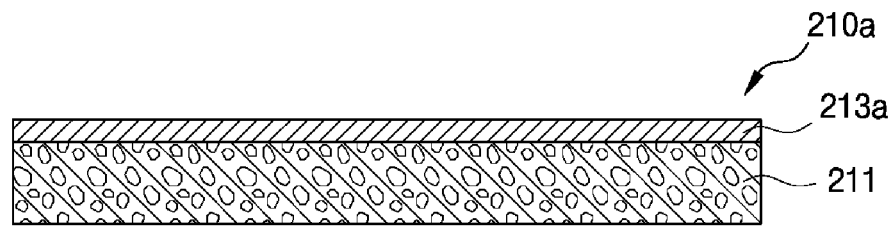
FIG. 9 is a cross-sectional view of a composite porous separator according to an embodiment of the present invention.

The accompanying FIGS. 8 and 9 are cross-sectional views respectively illustrating an example of a composite porous separator according to the present invention.

First, as shown in FIG. 8, the composite porous separator 210 in accordance with the present invention includes: a porous nonwoven fabric 211 that is used as a matrix and having fine pores; and a porous nanofiber web 213 that is used as an adhesive layer on at least one side of the porous nonwoven fabric 211 and is impregnated with an electrolytic solution.

The porous nonwoven fabric 211 that can be used as a substrate may be formed by using any one of a nonwoven fabric made of PP/PE fibers of a double structure in which PE is coated on an outer periphery of a PP fiber as a core, a PET nonwoven fabric made of polyethylene terephthalate (PET) fibers: or a nonwoven fabric made of cellulose fibers.

The porous nonwoven fabric 211 also has a porosity of a range of 70 to 80.

When the porous nanofiber web 213 that is laminated on one side of the porous nonwoven fabric 211 is interposed and assembled between a negative electrode and a positive electrode (not shown), the porous nanofiber web 213 plays a role of an adhesive layer to facilitate bonding with the negative electrode. To this end, the porous nanofiber web 213 is obtained by electrospinning a polymer having excellent adhesion with a negative electrode active material, for example, polyvinylidene fluoride (PVdF).

In addition, since the porous nonwoven fabric 211 has pores that are too large, an ultra-thin pore-free film 213a is preferably applied in place of the porous nanofiber web 213 to lower the porosity like the separator 210a according to the embodiment shown in FIG. 9.

The porous nanofiber web 213 and the pore-free film 213a may use polymers that are swelled in the electrolytic solution and allow the ion conductivity of the electrolyte, for example, any one of PVdF (polyvinylidene fluoride), PEO (Poly-Ethylene Oxide), PMMA (polymethyl methacrylate), and TPU (Thermoplastic Poly Urethane).

In particular, the PVdF is the most preferable as the polymer basically having a swelling function in the electrolytic solution, allowing the ion conductivity of the electrolyte, and providing excellent adhesion with the negative electrode active material.

The PVdF may be, for example, more preferably, a CTFE (chlorotrifluoroethylene)-based PVdF co-polymer containing 15 to 20 wt % of CTFE in VF (vinylidene fluoride), or a HFP (hexafluoropropylene)-based PVdF co-polymer containing 4 to 12 wt % of HFP in VF.

In the case that the CTFE-based PVdF co-polymer contains a CTFE co-monomer less than 15 wt %, it is not possible to prepare a PVdF co-polymer, while in the case that the CTFE-based PVdF co-polymer contains a CTFE co-monomer more than 20 wt %, heat resistant properties of the PVdF co-polymer deteriorate, the PVdF co-polymer is too soft, and absorption of the electrolyte is too much, to thus cause a problem of making it difficult to be used as a separator.

In addition, in the case that the HFP-based PVdF co-polymer contains a HFP co-monomer less than 4 wt %, it is not possible to prepare a PVdF co-polymer, while in the case that the HFP-based PVdF co-polymer contains a HFP co-monomer more than 2 wt %, heat resistant properties of the PVdF co-polymer deteriorate, to thus cause a problem of making it difficult to be used as a separator.

The CTFE-based PVdF co-polymer may use Solef® 32008 of Solvay Solef® PVdF Fluoropolymer Resins supplied by Solvay Solexis, and the HFP-based PVdF co-polymer may use Solef 21216 of Solvay Solef® PVdF Fluoropolymer Resins, or KYNAR FLEX LBG of ARKEMA KYNAR® PVdF Fluoropolymer Resins.

Since CTFE or HFP is included when the CTFE-based PVdF co-polymer and the HFP-based PVdF co-polymer produce the co-polymer, respectively, there is an advantage that the ion conductivity is improved more than the PVdF made of homo-polymers of VF when the PVdF co-polymer is used as a separator.

Figure 10:
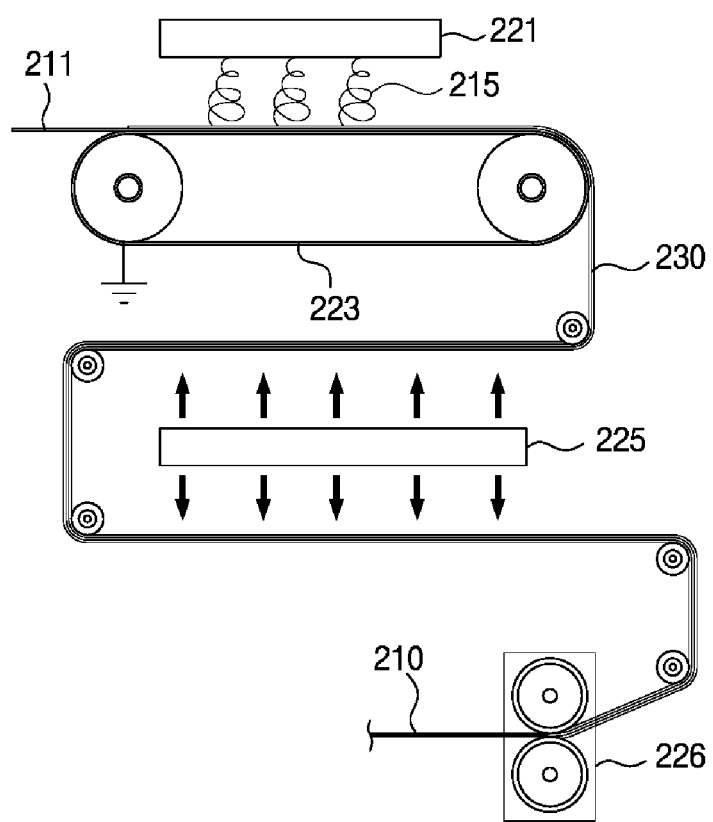
FIG. 10 is a diagram showing a process of manufacturing a composite porous separator according to the present invention.

In addition, the porous nanofiber web 213 is formed by: for example, dissolving a polymer that is swellable in an electrolytic solution and in which electrolyte ions are conductible in the electrolytic solution in a solvent to thus form a spinning solution; and electrospinning ultrafine nanofibers 215 on one side of the porous nonwoven fabric 211 by using the spinning solution from a multi-hole nozzle pack 221 as shown in FIG. 10, to then make the ultrafine fibers be collected on the porous nonwoven fabric 211 to form the porous nanofiber web.

The obtained porous nanofiber web 213 is calendered at a temperature lower than a melting point of a polymer in a calender device 226.

The pore-free film 213a may be formed by forming the porous nanofiber web 213 on one side of the porous nonwoven fabric 211 and then heat treating the surface of the porous nanofiber web 213 at a temperature lower than a melting point of a polymer (e.g., PVdF) by using a heater 225 in a subsequent step, to thereby convert the porous nanofiber web 213 into the pore-free film 213a.

The reason why a heat treatment process may be performed at a heat treatment temperature somewhat lower than the melting point of the polymer, is that the residual solvent remains in the polymer nanofiber web.

The average diameter of the fibers constituting the porous nanofiber web 213 has a very large effect on the porosity and the pore size distribution. The smaller the fiber diameter becomes, the smaller the pore size becomes, and the smaller the pore size distribution also becomes. In addition, the smaller the fiber diameter becomes, so the specific surface area of the fiber increases. Accordingly, a leakage-preventive capacity of the electrolytic solution increases, and thus the potential for leakage of the electrolytic solution is reduced.

The fiber diameter constituting the porous nanofiber web 213 is in a range of 0.3~1.5 μm. The thickness of the porous nanofiber web 213 used to form the pore-free film is in a 1~10 μm range, preferably the porous nanofiber web 213 is made of an extremely thin film of 3~5 μm thick.

The porous nanofiber web that is made of ultrafine nanofibers has the following features such as ultrathinning, ultra-lightweight, a high specific surface area to volume ratio, and a high porosity.

The pore-free film 213a applied to the embodiment does not act as a resistance since the pore-free film 213a is swelled in the electrolytic solution when the pore-free film 213a is impregnated in the electrolytic solution, while allowing the conduction of lithium ions, and is formed of an ultrathin film, and increasing the mobility of the lithium ions.

When the pore-free film 213a is compressed to be adhered on the surface of a negative electrode active material layer as described above, at the time of an electrode assembly at a later time, the pore-free film 213a is swelled while allowing the conduction of lithium ions but blocking formation of a space between the negative electrode and the separator, to thereby prevent lithium ions from being stacked and collected to then prevent a phenomenon of being precipitated into a lithium metal. As a result, it is possible to inhibit dendrite formation on the surface of the negative electrode to thus enhance stability.

The spinning solution that is prepared by electrospinning the porous nanofiber web 213 may contain a predetermined amount of inorganic particles to improve the heat resistance and strength. The content of inorganic particles and the like are applied in the same manner as in forming the porous nanofiber web 213.

The secondary battery according to the present invention includes an electrolytic solution in an electrode assembly that is formed by inserting a separator between a negative electrode and a positive electrode and compressing and assembling the separator, the negative electrode and the positive electrode. The electrolytic solution includes a non-aqueous organic solvent and a lithium salt solute. The electrolytic solution may be the same as that used in forming the polymer electrolyte 5 shown in FIG. 1.

As described above, after the assembly of the electrode assembly, the electrode assembly is contained in a vessel such as an aluminum can or aluminum alloy can or the like, an opening portion is closed with a cap assembly, and an electrolytic solution is injected into the vessel, to thereby prepare a secondary battery.

When an electrolytic solution is injected into the can or a case in which the electrode assembly is encased and sealed, the porous nanofiber web 213 or the pore-free film 213a made of PVdF is gelled and swelled while containing the electrolytic solution.

Part of the porous nanofiber web 213 or the pore-free film 213a that is swelled is pushed into the inside of the larger pores of the porous nonwoven fabric 211, thereby blocking an entrance of the pore at one side of the porous nonwoven fabric 211, to thus lower the porosity.

In particular, thickness of the pore-free film 213a laminated on the porous nonwoven fabric 211, is in a range from 1 to 10 μm, preferably is made of an ultrathin film of 3 to 5 μm. Accordingly, when the electrolytic solution is injected and impregnated into the pore-free film 213a, the pore-free film 213a is swelled, and thus fine pores are formed to thereby allow movement of lithium ions. As a result, while a micro-short phenomenon will not occur, characteristic of OCV can be greatly improved.

In addition, when the electrolytic solution is injected and impregnated into the porous nanofiber web 213 laminated on the porous nonwoven fabric 211, the nanofibers of the nanofiber web is swelled by about 500 times, and thus the pore size is reduced, to thereby be made into a film. As a result, movement of the lithium ions is allowed through the fine pores of the nanofiber web, the occurrence of the micro-short phenomenon is blocked to thereby greatly improve the OCV characteristics.

Furthermore, according to the present invention, since the porous nonwoven fabric 211 is used as a substrate, and one side of the nonwoven fabric is made of, for example, PVdF pore-free film 213a, the pore-free film 213a having the excellent adhesion is assembled in close contact with the surface of the negative electrode, to thereby serve to suppress dendrite formation.

The composite porous separator 210 according to the present invention, as shown in FIG. 8, may be applied to the lithium polymer battery including the positive electrode, the pore-free gel-type polymer electrolyte and the negative electrode, for example, as shown in FIG. 1.

In this case, the polymer electrolyte employs a composite porous separator 210 that is formed by laminating the porous nonwoven fabric 211 and the porous nanofiber web 213 made of a plurality of nanofibers 215. The nanofibers 215 is obtained by spinning a mixed polymer spinning solution that is obtained by mixing and dissolving a swellable polymer and a non-swellable polymer, so as to have a core-shell structure that the swellable polymer shell 150a surrounds the outside of the non-swellable polymer core 150b, in the same manner as the nanofibers 150 shown in FIG. 1. The mixed polymer is formed by a combination of the swellable polymer and the non-swellable polymer so that a difference in molecular weights between the swellable polymer and the non-swellable polymer such as PAN and PVDF is preferably at least 20 times.

Then, the composite porous separator 210 is obtained by laminating the porous nanofiber web 213 made of the mixed polymer and the porous nonwoven fabric 211, and then the composite porous separator 210 is encapsulated as shown in FIG. 1 or 5. Then, the composite porous separator 210 that has been encapsulated is assembled with a positive electrode and a negative electrode, thereby preparing an electrode assembly. After preparing the electrode assembly, the electrode assembly is encased in a case, an electrolyte solution is injected into the case, the gelling heat treatment is carried out, and finally the gel-type polymer electrolyte is formed between the positive electrode and the negative electrode.

Hereinbelow, a method of manufacturing the composite porous separator according to the present invention will be described with reference to FIGS. 10 and 11.

As shown in FIG. 10, in order to form a composite porous separator 210 in accordance with an embodiment of the present invention, a polymer that is swellable in an electrolytic solution and that allows electrolyte ions to be conductible in the electrolytic solution is dissolved in a solvent to thus prepare a spinning solution.

Thereafter, ultrafine nanofibers 215 are electrospun on one side of the porous nonwoven fabric 211 that is transferred along a lower collector 223 by using the spinning solution from a multi-hole nozzle pack 221, for example, in an air-electrospinning method, to then form the porous nanofiber web 230 to thus form a two-layer structure laminate.

The air-electrospinning (AES) method according to the present invention is a spinning method, in which a high voltage electrostatic force of 90~120 Kv is applied between the spinning nozzles of the multi-hole nozzle pack 221 from which a polymer solution is spun and the collector 223, and thus ultrafine fibers 215 are spun on the collector 223, to thus form the porous polymer web 230, in which case air is sprayed for each spinning nozzle to thus prevent the spun fibers from flying without being collected on the collector 223.

The two-layer structure laminate is calendered in a calender device 226 to thus achieve the thickness control of the laminate, and to thereby obtain a composite porous separator 210 made of the porous nonwoven fabric 211 and the porous polymer nanofiber web 213 as shown in FIG. 8.

Meanwhile, in the case of producing a composite porous separator 210a in accordance with another embodiment, on one side of the porous nonwoven fabric 211, the porous nanofiber web 230 is laminated on one side of the porous nonwoven fabric 211, and the porous nanofiber web 230 is fed in a state of being exposed to the heater 225. Then, the porous nanofiber web 230 is converted to the pore-free film 213a.

Then, the two-layer structure laminate is calendered in the calender device to thus achieve the thickness control of the laminate, and to thereby obtain a composite porous separator 210a made of the porous nonwoven fabric 211 and the pore-free film 213a as shown in FIG. 9.

Figure 11:
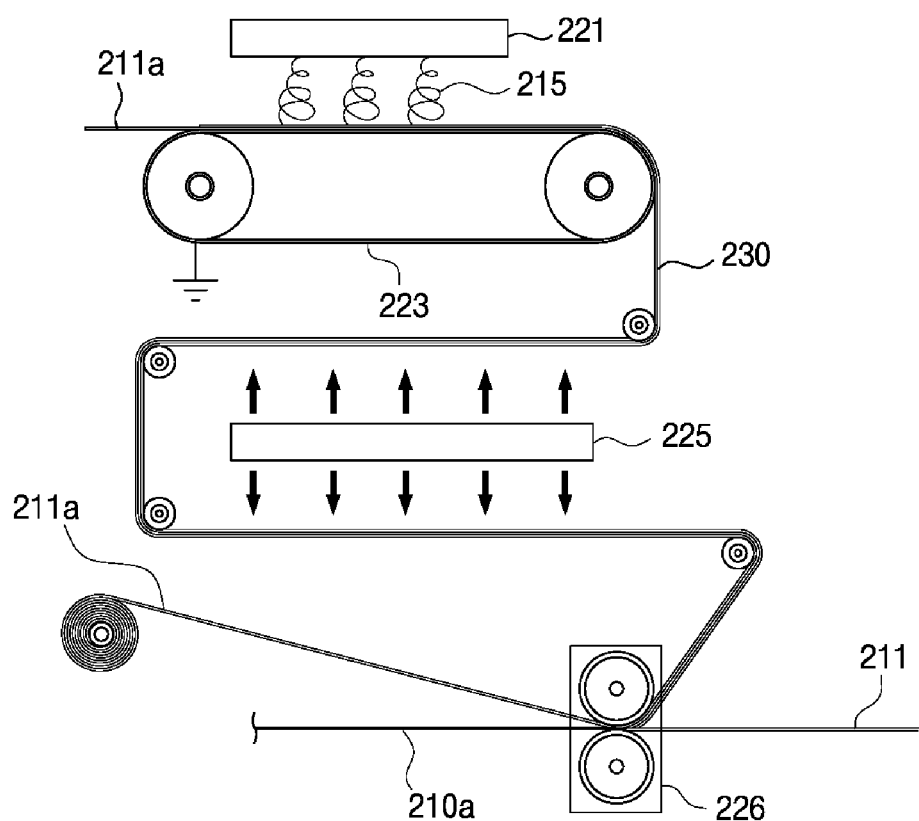
FIG. 11 is a diagram showing a modified process of manufacturing a composite porous separator according to the present invention.

However, as shown in FIG. 11, according to the process of manufacturing the composite porous separator according to the present invention, ultrafine nanofibers 215 are electrospun on one side of a transfer sheet 211a that is transferred along a lower collector 223 by using the spinning solution from a multi-hole nozzle pack 221, to then form the porous nanofiber web 230 made of the ultrafine nanofibers.

The transfer sheet 211a may be formed by using, for example, a paper, a nonwoven fabric made of a polymeric material that is not dissolved by a solvent contained in a spinning solution during spinning of the spinning solution, or a polyolefin-based film such as PE or PP. In the case that only the porous nanofiber web is formed with no lamination on top of the transfer sheet 211a, a tensile strength of only the porous nanofiber web is low, and accordingly it is difficult to execute a drying process, a calendering process and a winding process while being fed with a high feed rate.

Furthermore, after having produced the porous nanofiber web, it is difficult to execute a subsequent sealing process of a positive or negative electrode continuously with a high feed rate. However, in the case of using the transfer sheet 211a, a sufficient tensile strength is provided to thus significantly increase a processing speed.

In addition, when using only the porous nanofiber web, a sticking phenomenon to another object due to a static electricity may happen, and thus the workability falls, but the problem can be solved when using the transfer sheet 211a.

Furthermore, the electrospun nanofibers are collected on the collector and are laminated along the pattern of the collector (For example, when the nanofibers are spun on a diamond pattern, the nanofibers start to be collected along the initial diamond pattern.).

Thus, in order to make a porous nanofiber web of nanofibers having good uniformity such as a pore size, permeability, thickness, and weight, it is more suitable to spin nanofibers on paper than a nonwoven fabric.

In the case of performing a calendering process by spinning nanofibers directly on a nonwoven fabric, a control of a calendering temperature is limited by the melting point of the nonwoven fabric. A coupling temperature between PVdF fibers is about 150° C., but the melting point of the nonwoven fabric is about 110 to 130° C. lower than this coupling temperature. Therefore, when nanofibers are spun on paper to form a porous nanofiber web, a primary calendering process is executed at about 150° C., and a secondary calendering process is executed at a temperature lower than the primary calendering temperature, to thereby be laminated with the nonwoven fabric, a solid bond can be achieved between the fibers to thus make a highly completed porous nanofiber web.

In addition, when forming a porous nanofiber web of nanofibers by using a transfer sheet such as paper, a residual solvent contained in the nanofiber web is absorbed by the transfer sheet such as paper, to thus prevent the nanofibers from being melted again by the residual solvent, that is, prevent a re-melting phenomenon of the nanofibers by the residual solvent, and to also play a role of controlling of an amount of the residual solvent as appropriate.

Thereafter, the porous nanofiber web 230 formed on the transfer sheet 211a is calendered in the calender device 226 by laminating the porous nanofiber web 230 obtained in the residual state of the solvent on one side of the porous nonwoven fabric 211, to thereby make it possible to form a composite porous separator 210 of a two-layer structure according to an embodiment. The transfer sheet 211a is peeled and removed after the lamination process as shown in FIG. 11.

A spinning method that may be used to manufacture a porous separator according to the present invention may employ any one selected from general electrospinning, electrospray, electrobrown spinning, centrifugal electrospinning, and flash-electrospinning, in addition to the air-electrospinning (AES).

The multi-hole spinning pack nozzles used in the present invention are set to have an air pressure of an air spray in a range of 0.1~0.6 MPa when using the AES (air-electrospinning).

Considering that volatilization of the solvent may not be made well in accordance with the type of a polymer when using a single solvent, in the present invention, a process of adjusting the amount of the residual solvent and moisture remaining on the surface of the porous nanofiber web may be undergone while passing through a pre-air dry zone according to a pre-heater 225 after the spinning process.

As shown in FIG. 3, in the pre-air dry zone by the pre-heater 28, air of 20 to 40° C. is applied to the porous nanofiber web 15 by using a fan, thereby adjusting an amount of the solvent and moisture remaining on the surface of the porous nanofiber web 15. As a result, the porous nanofiber web 15 is controlled so as to be prevented from being bulky. The air blow of the fan plays a role of increasing strength of the separator and controlling porosity of the separator.

In this case, if calendering is accomplished at a state where evaporation of the solvent has been excessively performed, porosity is increased but strength of the nanofiber web is weakened. Reversely, if less evaporation of the solvent occurs, the nanofiber web is melted.

The separator made of the porous nanofiber web with a single layer or multi-layer structure has a low tensile strength, and thus the tensile strength of the separator may be improved by using a porous nonwoven fabric made of a relatively high tensile strength nonwoven fabric as a matrix support as in the present invention.

Although the case that the composite porous separator 210 or 210*a* has been formed into the two-layer structure in which the porous nanofiber web 213 or the pore-free film 213*a* has been laminated on one side of the porous nonwoven fabric 211, has been described in the embodiment, it is possible to form the composite porous separator 210 or 210*a* of a three-layer structure in which the porous nanofiber web 213 or the pore-free film 213*a* is laminated on either side of the porous nonwoven fabric 211, as necessary.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention relates to a lithium ion polymer battery having a polymer electrolyte that prevents a short circuit between two electrodes and promotes safety and thinning in which nanofibers constituting a porous nanofiber web have a core-shell structure, and although a swellable polymer shell disposed at the outside of each of the nanofibers is gelled by an electrolytic solution, a non-swellable polymer core that is not swelled by the electrolytic solution and disposed at the inside thereof maintains a uniform web-like shape.

What is claimed is:

1. A porous separator comprising:
a porous nanofiber web that plays a role of an adhesive layer and an ion-containing layer when the porous nanofiber web is in close contact with an opposed electrode,
wherein the porous nanofiber web comprises a plurality of nanofibers having a core-shell structure, along the longitudinal direction thereof, wherein each of the plurality of nanofibers comprises a swellable polymer shell disposed at the outside thereof and made of a swellable polymer that is swelled in an organic electrolytic solution, and a non-swellable polymer core at the inside thereof and made of a non-swellable polymer.

2. The porous separator according to claim 1, wherein the swellable polymer is any one of polyvinylidene fluoride (PVDF), polyethylene oxide (PEO), polymethyl methacrylate (PMMA), and thermoplastic polyurethane (TPU).

3. The porous separator according to claim 1, wherein the swellable polymer is a CTFE (chlorotrifluoroethylene)-based PVDF copolymer or a HFP (hexafluoropropylene)-based PVDF copolymer.

4. The porous separator according to claim 3, wherein the CTFE-based PVDF copolymer contains CTFE of 15 to 20 wt % in VF (vinylidene fluoride), and the HFP-based PVDF copolymer contains HFP of 4 to 12 wt % in the VF.

5. The porous separator according to claim 1, wherein thickness of the porous nanofiber web is set to be in a range from 1 μm to 10 μm.

6. The porous separator according to claim 1, wherein a molecular weight of the non-swellable polymer is at least 20 times that of the swellable polymer.

7. The porous separator according to claim 1, wherein the porous nanofiber web comprises the non-swellable polymer of 40 to 90 wt % and the swellable polymer of 10 to 60 wt %.

8. The porous separator according to claim 1, further comprising a porous nonwoven fabric playing a support role and having micropores, wherein the porous nanofiber web that is laminated on one side of the porous nonwoven fabric, and wherein a portion of the porous nanofiber web is incorporated in a surface layer of the porous nonwoven fabric, to thus partially block pores of the porous nonwoven fabric and to thereby lower porosity of the porous nonwoven fabric.

9. The porous separator according to claim 8, wherein thickness of the porous nonwoven fabric is set to be in a range from 10 μm to 40 μm.

10. The porous separator according to claim 8, wherein the porous nonwoven fabric is any one of a nonwoven fabric made of PP/PE (Polyethylene/Polypropylene) fibers of a double structure where PE (Polyethylene) is coated on an outer periphery of a PP (Polypropylene) fiber as a core, a PET nonwoven fabric made of polyethylene terephthalate (PET) fibers, and a nonwoven fabric made of cellulose fibers.

11. A secondary battery comprising:
a positive electrode;
a negative electrode;
a separator separating the positive electrode and the negative electrode; and
an electrolytic solution,
wherein the separator comprises:
a porous nanofiber web that plays a role of an adhesive layer and an ion-containing layer when the porous nanofiber web is in close contact with an opposed electrode,
wherein the porous nanofiber web comprises a plurality of nanofibers having a core-shell structure, along the longitudinal direction thereof, wherein each of the plurality of nanofibers comprises a swellable polymer shell disposed at the outside thereof and made of a swellable polymer that is swelled in an organic electrolytic solution, and a non-swellable polymer core at the inside thereof and made of a non-swellable polymer.

12. The secondary battery according to claim 11, wherein the swellable polymer is a CTFE (chlorotrifluoroethylene)-based PVDF copolymer or a HFP (hexafluoropropylene)-based PVDF copolymer.

13. The secondary battery according to claim 11, wherein the porous nanofiber web is impregnated in the electrolytic solution where a lithium salt is dissolved in a non-aqueous organic solvent, to then undergo a gelling process, in a manner that the swellable polymer shell disposed at the outside of each of the nanofibers is gelled by the electrolytic solution, and the non-swellable polymer core at the inside thereof maintains a web-like shape.

14. The secondary battery according to claim 11, wherein the porous nanofiber web undergoes a gelling process, to thus constitute a polymer electrolyte.

15. The secondary battery according to claim 14, wherein the positive electrode and the negative electrode are made of a plurality of unit electrode cells that are stacked alternately, and are separated by the polymer electrolyte, further comprising: a compression band to block a plurality of the positive electrode unit cells and a plurality of the negative electrode unit cells that are separated by the polymer electrolyte and stacked from expanding in a lamination direction of the electrodes.

* * * * *